March 24, 1959     A. PACCIARINI ET AL     2,878,856
AUXILIARY APPARATUS FOR USE IN THE MANUFACTURE OF TIRES
Filed May 9, 1955     4 Sheets-Sheet 4
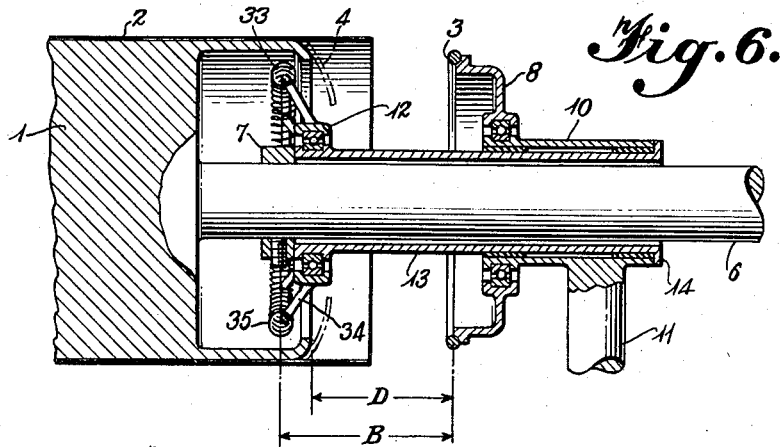
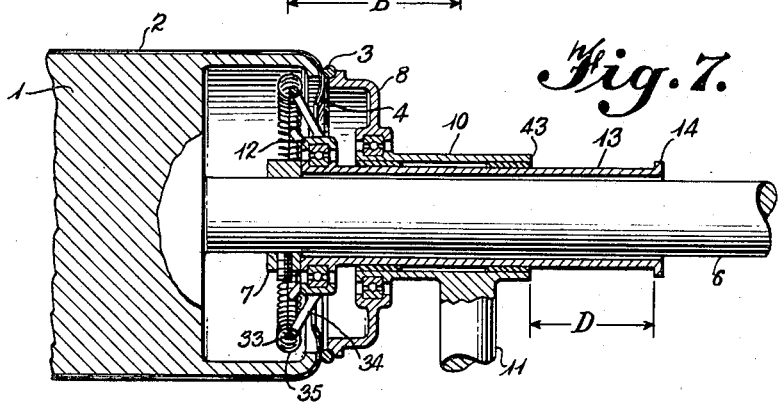
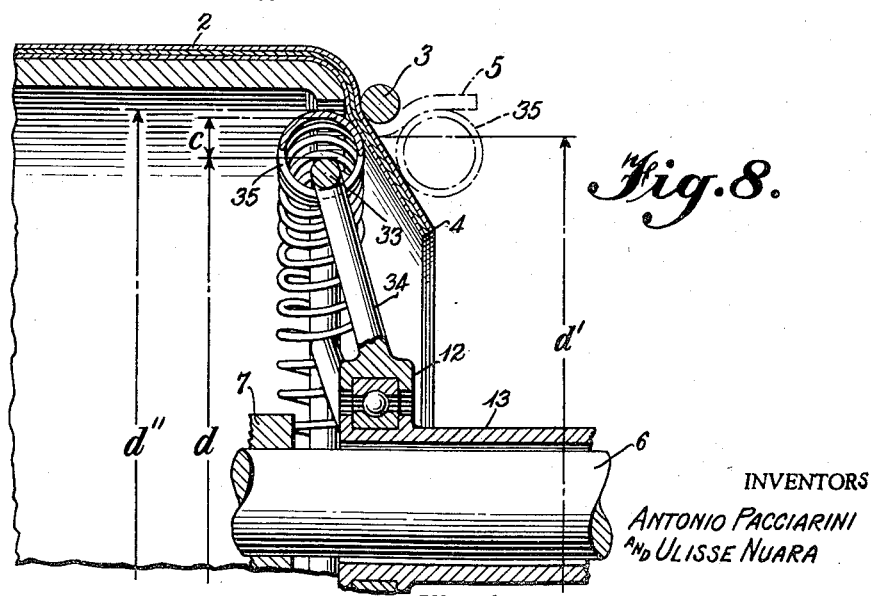
INVENTORS
ANTONIO PACCIARINI
AND ULISSE NUARA
BY Stevens, Davis, Miller & Mosher
ATTORNEYS

United States Patent Office 2,878,856
Patented Mar. 24, 1959

2,878,856

AUXILIARY APPARATUS FOR USE IN THE MANUFACTURE OF TIRES

Antonio Pacciarini and Ulisse Nuara, Milan, Italy, assignors to Pirelli S.p.A., Milan, Italy Application May 9, 1955, Serial No. 506,942

Claims priority, application Italy May 25, 1954

11 Claims. (Cl. 154—9)

The present invention relates to an auxiliary apparatus for use in the manufacture of tires for vehicles of all types.

It is a conventional practice in the tire building art to wrap two or more plies of rubberized fabric onto a collapsible tire-building drum having rounded shoulders, the fabric being a cord fabric composed of a plurality of parallel reinforcing filaments or strands and having a width substantially in excess of the length of the drum.

The lateral edges of the plies, which extend beyond the two sides of the drum, are then folded inwardly on the rounded shoulders of the drum itself (ply turn-down operation).

Upon completion of the wrapping of the tire fabric, a pair of metallic rings covered with rubber are applied to the folded plies at the ends of the drum and serve as a means upon which the bead of the tire casing may be conveniently formed. The marginal portions of the fabric which extend outward from the bead ring assemblies, after the positioning thereof, are then turned outwardly and folded over the shoulders (ply turn-up operation).

The turn-up operation is generally carried out by means of discs or rollers provided with suitable throat (see patent application Serial No. 417,328, filed March 19, 1954) which engage the fabrics to be folded at the interior of the shoulders of the drum in registry with the bead rings and which, upon completing a suitable rotation about said shoulders, cause the uniform adhering of the plies around said bead rings.

To enable the rollers to accomplish the aforesaid operation, it is necessary that the edges of the fabric which, upon the turn-down operation and application of the bead rings, are in a substantially normal position with respect to the rotational axis of the drum, be subjected to preliminary spreading out in order to bring them into a position substantially parallel to said axis.

The mechanical execution of this operation presents many difficulties, especially in cases where a larger number of plies of tire fabric are used and the resulting edge to be spread out is somewhat rigid. In such cases, even if the edge is deformed by being drawn toward the periphery of the drum it will have a tendency to immediately return to its initial position.

The principal object of the present invention is a mechanical device for carrying out, in an effective and permanent manner, the spreading out of the tire fabric even when a large number of ply layers of fabric are used.

Other objects and advantages of the invention will appear from the following description thereof taken in connection with the drawings, in which:

Figure 5 is a schematic diagram of the pneumatic control of the pistons that actuate the device with the representation relative to spreader operating in conjunction with the left shoulder of the drum omitted for the sake of simplicity; and Figures 6 to 8 are sectional views illustrating the operation of the device.

Figure 1:
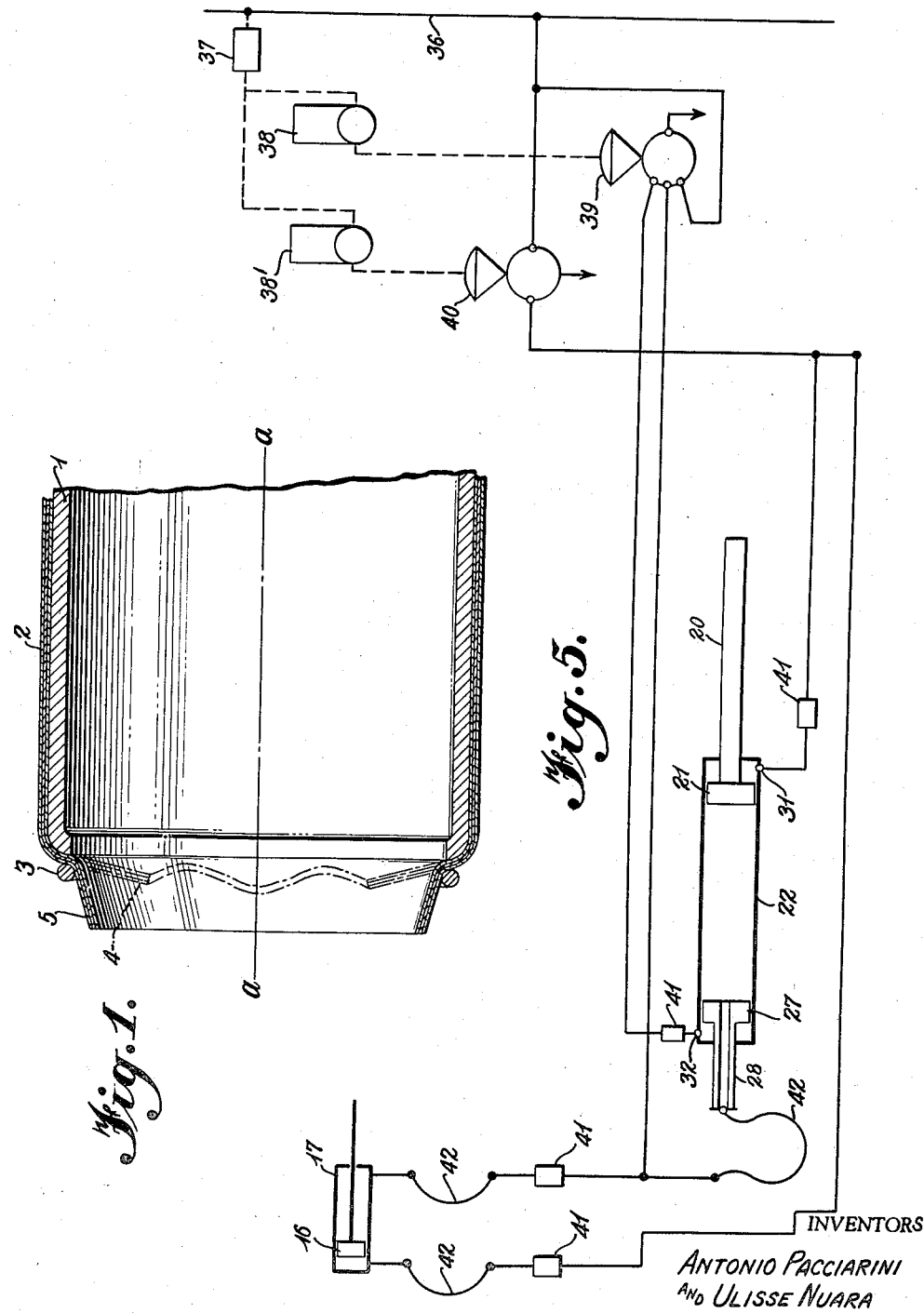
Figure 1 is a fragmentary sectional view of the building machine taken along a plane passing through its rotational axis, upon completion of the spreading.

Referring now to the drawings in detail, there will be described the preferred embodiment of the invention.

Figure 1 of the drawings shows clearly the operation involving the spreading of the fabric plies. The plies 2 are wrapped upon the tire building drum 1 and their edges, after being folded around the shoulders of the drum and the positioning of the bead rings, are disposed as shown in position 4 of the drawing. The device of the present invention is provided for the purpose of spreading and, at the same time, partly stitching said edges around the head rings 3 to cause them to occupy position 5.

Figure 2:
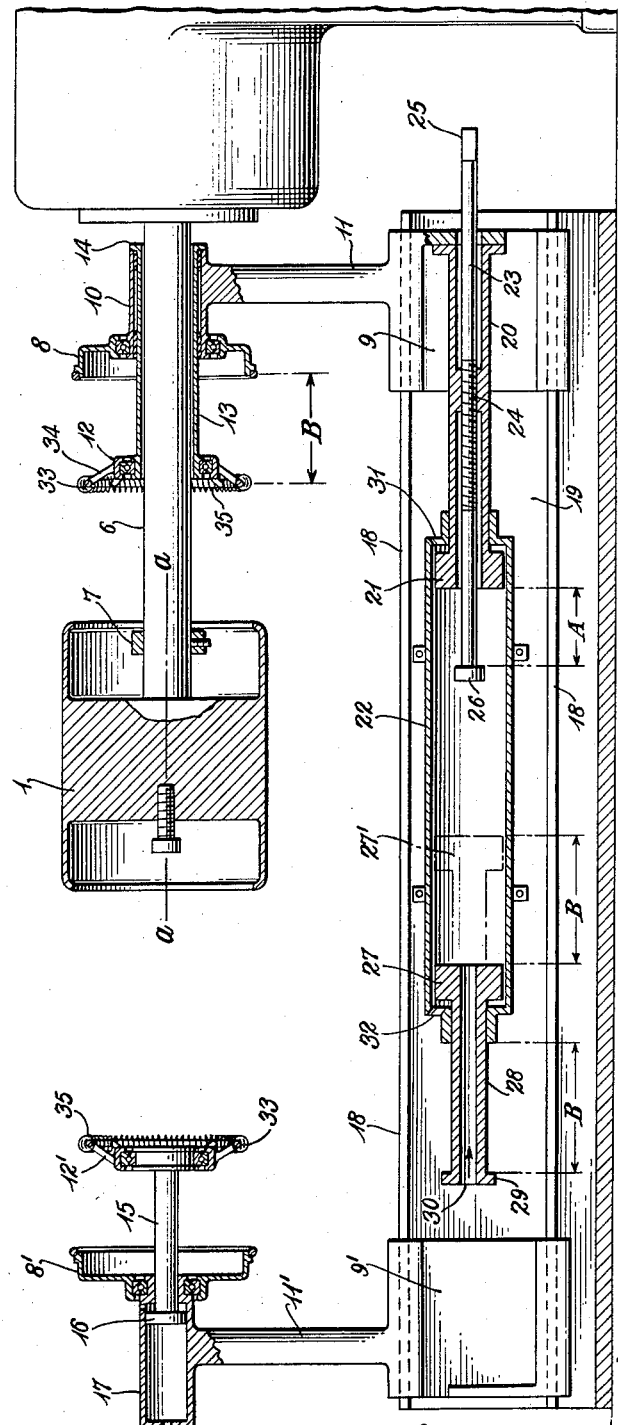
Figure 2 is a fragmentary sectional view of the building drum taken along a vertical plane passing through the rotational axis of the drum, wherein the stitching device is omitted and wherein, for the sake of simplicity, only the devices provided for the control of the spreader and bead ring carrier operating in conjunction with the right shoulder of the drum are shown.

Figure 2 shows a tire building drum 1, rotatable about its axis $a$—$a$ and supported by mandrel 6. Mandrel 6, provided with an adjustable stop ring 7, passes axially through bead ring carrier 8, which is supported by slide 9 by means of hub 10 and column 11. The spreading device 12, coaxially positioned to the bead ring carrier 8 is, in turn provided with a hub 13 whose extremity is provided with a stop 14. Thus, it will be seen that the spreader 12 is indirectly supported by slide 9. Both the bead ring carrier 8 and the spreader 12 are adapted to rotate about their axis, the spreader 12 being, in addition, capable of moving axially relative to bead ring carrier 8 so that it can move toward or away from said bead ring carrier 8.

A second bead ring carrier 8' is traversed by a stem 15 having a spreader device 12' secured to one of its extremities. At the other extremity of stem 15 is positioned piston 16 sliding within cylinder 17 which, in turn, is supported by slide 9' through the agency of column 11'. The bead ring carrier 8' and the spreader 12' are coaxial and rotatable about their axes.

Since the devices that control and actuate the spreading device 12', which operates in conjunction with the left shoulder of the drum, have been omitted from Figures 2 and 5, for the sake of simplicity, because they are analogous and symmetrical with respect to those pertaining to spreading device 12 operating to the right of the drum, the description that follows will be confined to this last-named device.

Slide 9 is adapted to move upon guides 18 along frame 19. Slide 9 is connected through tube 20 to piston 21 mounted in cylinder 22 attached to frame 19. Tube 20 receives shaft 23 and these two elements are mechanically connected by means of a long screw thread 24 on shaft 23 and a complementarily threaded section on the internal surface of tube 20. By causing the extremity 25 of shaft 23 to rotate, the latter is displaceable along tube 20 and, consequently, its extremity 26 moves toward or away from piston 21 inside cylinder 22, thereby causing the distance A to vary. At the opposite extremity of cylinder 22 is mounted piston 27, whose hollow stem 28 is provided with a stop 29 which limits the stroke of piston 27 to the linear distance B. Fluid under pressure, for example compressed air, to actuate pistons 21 and 27, may be introduced or discharged through opening 30 of stem 28, as well as through openings 31 and 32 of cylinder 22.

Figure 3:
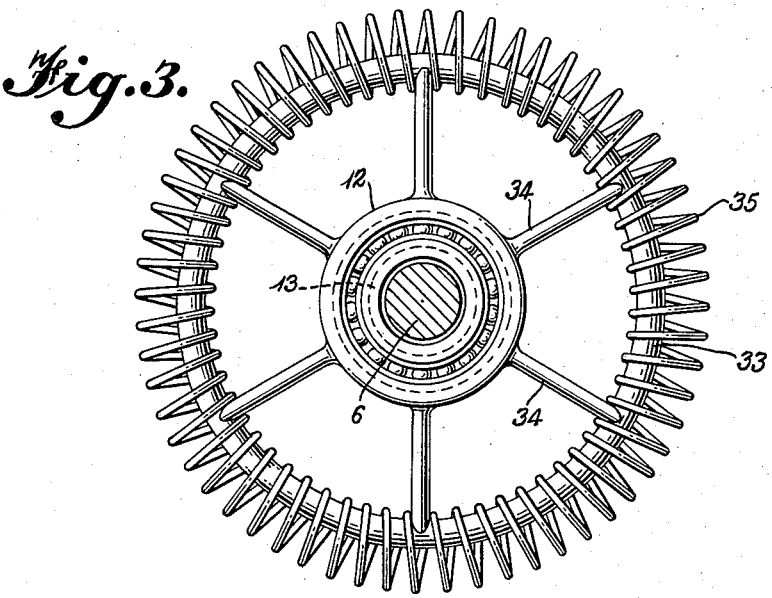
Figure 3 is a front elevational view of the spreader ring.
Figure 4:
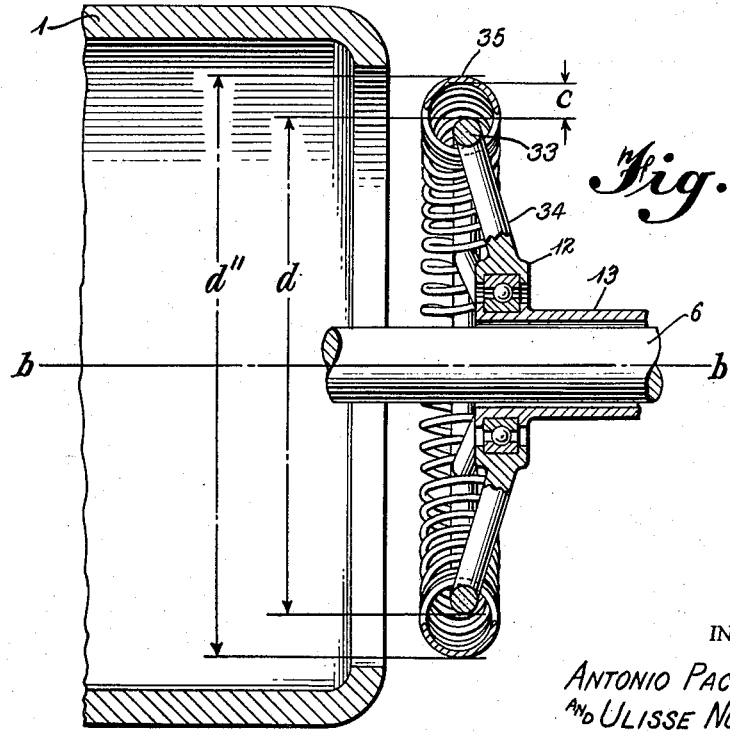
Figure 4 is a view in section of the drum and spreader ring taken along a plane passing through the rotational axis of the drum.

One of the spreading devices 12 is shown in greater detail in Figures 3 and 4. It is constituted of a metallic ring 33 of circular cross-section connected to hub 13 by means of spokes 34. Coiled spring 35 is wound in a continuous manner around ring 33 which has an external diameter $d$. This spring 35 is a closed coil spring of metallic wire having constant characteristics throughout this length, including the weld point connecting its ends. The coils of the spring have an internal diameter greater than the diameter of the cross-section of ring 33. The spring itself is wound in such a way that it is subjected to preliminary compression so that it would quickly expand in the absence of ring 33 which is holding it in place. Consequently, the coils push against the interior surface of ring 33 and project with the diametrically opposed part from the external surface of ring 33 by quantity (distance) C. The spring, therefore, represents a resilient organ wound around ring 33 which may yield in the radial direction a quantity C resulting in the spring being subjected to further compression when it contacts the material to be spread. From a consideration of Figure 3, it should be apparent that the relative dimensions of the spokes 34 and the coils of the ring 35 are such that the coils on the opposite sides of the various spokes 34 are sufficiently close together that they contact the side edges of the spokes; however, it should be further apparent that the average pitch of the coils is greater than the thickness of the spokes such as to permit the spring to roll around its own axis when circumferentially compressed.

The diagram showing the pneumatic control of pistons 21 and 27, contained in cylinder 22, and of piston 16 contained in cylinder 17 is represented in Figure 5. The control of piston 16 is not indispensable as far as the functioning of the machine is concerned but is, nevertheless, very helpful in that it permits the spreader 12' to be moved closer to the bead carrier 8', thus increasing the available free space for removal of the casing from the drum upon completion of the tire building operation without increasing the length of the machine.

Referring now to Figure 5 of the drawings, it will be observed that a conduit 36 for the supply of compressed air is provided connected with a pressure reducing valve 37, two electrically operated valves 38 and 38' which serve to control diaphragm valves 39 and 40, respectively, which are four-way and three-way valves respectively, and with valves 39 and 40. Flow regulators 41 and flexible tubes 42 are provided to permit passage of compressed air notwithstanding the relative displacement of the elements connected therewith. Suitable electrical contacts controlled manually or automatically by the movements of the building machine are provided for the control of the electromechanical valves 38 and 38' and, therefore, also control the movement of pistons 16, 27 and 21.

Based upon the foregoing description, it is possible to explain the operation of the various elements that require some preliminary adjustment with respect to the building drum.

Such preliminary adjustment consists in suitably regulating the distance A between the stop 26 and piston 21 and, consequently, the stroke of piston 21. When the slide 9 is displaced by the piston 21 towards the shoulder of the drum, it will carry along the bead ring carrier 8 and, as a result of the friction between hubs 10 and 13, also the spreader 12, until the hub 13 of the latter contacts stop ring 7.

The distance A must be adjusted in such a way that upon the introduction of compressed air into cylinder 22, first through opening 32, in order to cause the piston 27 to slide along the distance B, as permitted by stop 29, until it occupies position 27', and thereafter through opening 31, the stroke of piston 21 will be such that, when stop 26 reaches piston 27 in position 27', the hub 13 comes into contact with the ring of stop 7. The position of ring 7 is fixed in such a way that when hub 13 is stopped against stop 7 the spreader ring 33 will be located inside the building drum 1. In order to arrest stop 26 against piston 27 in position 27', it is necessary that the air introduced through opening 32 be subjected to a pressure greater than that corresponding to the air introduced through opening 31.

After such adjustment, all elements are brought into a position of repose by evacuating the compressed air from openings 31 and 32, and introducing, instead, such compressed air through opening 30 of the hollow stem 28 until pistons 21 and 27 have reached their initial position at the two opposite extremities of cylinder 22.

In Figures 6, 7 and 8 are represented the operations involving the introduction of the spreaders 12 and 12' within the interior of the drum, the application of the bead rings and the spreading of the plies. Since these operations are carried out symmetrically and simultaneously on both shoulders of the drum, reference will be made only to the right shoulder represented in the above-mentioned figures.

Before starting the wrapping of the plies on the drum, bead ring 3 is placed on bead ring carrier 8. Air is then introduced into cylinder 22, first through opening 32 and then, with less pressure, through opening 31 until stop 26 comes to rest against piston 27 in position 27'.

In this way the spreader ring 33 comes to lie within the drum whereas the bead ring 3, supported by the bead ring carrier 8, remains outside at a distance D from the edge of the drum sufficient to allow the turn-down operation of the fabric. At this point the building drum is caused to rotate and the first fabric bands 2 are applied to the drum and thereafter turned down against the ends thereof to the position shown at 4. The drum is then stopped and air is discharged through opening 32 while continuing its admission through opening 31. Piston 27 withdraws to its initial position of repose while piston 21 which is no longer impeded by piston 27 continues to advance in cylinder 22, carrying along slide 9 and bead ring carrier 8 and causing hub 10 to run over hub 13 which is blocked by stop 7. Since the stroke of piston 27 is greater than distance D between the edge of the drum and bead ring 3, the bead ring carrier 8 rests upon the drum shoulder urging bead ring 3 against the folded fabric.

The building drum 1 is then again set in motion and its rotational movement carries along the bead ring carrier 8 and the spreader 12. When the drum has reached a certain rotational speed (which may be in the neighborhood of 300 revolutions per minute even in the case of several fabric plies) air is discharged from opening 31 and is introduced through opening 30 of hollow rod 28, thus giving rise to the return movement of piston 21 to the extremity of cylinder 22. During this return movement, piston 21 first pushes back only slide 9 and bead ring carrier 8 and, after having traveled a distance equal to distance D, also pushes the spreader 12 compelling ring 33 to emerge from the building drum. In fact, after having traveled the distance D, the extremity 43 of hub 10 engages stop 14 of hub 13 and, as it continues its movement, the latter will be carried along to its initial position of repose. The emergence of spreader ring 33 from the edge of the drum is prevented by the edge 4 of the fabric bands 2 inasmuch as the diameter $d'$, corresponding to the circular opening defined by fabric bands 2, in the plane passing through the axis of the bead ring is smaller than the external diameter $d''$ of spring 35 of the spreader in position of repose. Since the difference between the diameters $d''$ and $d'$ is less than 2C (see also Figure 4), the ring 33 is able to emerge from the drum shoulder by subjecting the already compressed radially resilient spring 35 wound thereon to further compression.

The elastic reaction of the coils making up the spring, during said emergence of the spreader from the drum shoulder, is uniformly exerted upon the entire internal periphery of the fabrics adjoining bead ring 3, thus insuring perfect adherence thereof to the internal edge of said bead ring. Spring 35, during its contracted phase for its passage through the opening of diameter $d'$, does not creep on the fabric bands but rather rolls about itself in such a way that its coils exert a positive tangential stitching action on the fabric bands surrounding the bead ring. As soon as the spring has passed beyond the bead ring and has dragged the edges of the fabric bands outwardly, it will expand radially, regaining its initial external diameter $d''$ and in so doing will cause the edges of the fabric bands to adhere to the external part of the bead ring in such a way that these will occupy the position 5 and will be incapable of returning to position 4.

The rotational speed of the building drum, suitably predetermined, creates a centrifugal force upon edges 5 of fabrics 2 and thus contributes in maintaining the edges perfectly spread out.

The mechanism according to the preceding description is capable of rapid and efficient operation to effect homogeneous spreading in order to facilitate the introduction into the interior of the drum shoulders, rollers and other devices employed for the subsequent turn-up operation of the edges of the fabric bands. The same mechanism can be used to advantage, after suitable modification, also for stitching the fabric bands on the upper part of the drum, if the spring, prior to being wound around the ring, is subjected to preliminary tension rather than preliminary compression, in which case its coils would normally push against the ring and towards the rotational axis of the drum, allowing the spring to expand radially equal to value C when subjected to further tension upon contacting the fabric bands to be stitched.

Although the present invention has only been shown and described with reference to a preferred embodiment, nevertheless, various changes obvious to one skilled in the art are deemed to be within the spirit and scope of this invention.

What is claimed is:

1. Apparatus for spreading the projecting already folded edges of sheet material wrapped on a building drum for tire casings and for stitching said sheet material around previously applied bead rings, comprising a ring of circular cross-section, a hub, radial spokes connecting said ring with said hub, said hub being mounted coaxially with respect to the drum and slidable along its axis relative thereto, a pre-compressed coil spring wound in a continuous manner around said ring, the internal diameter of the coils of said spring being greater than the diameter of the cross-section of said ring such that said spring is circumferentially compressible when it contacts sheet material to be spread, the pitch of the coils of said spring being greater than the thickness of said spokes to permit said spring to roll around its own axis, and means for sliding said hub along said shaft to move said ring between a position within said drum and a position remote from said drum.

2. Apparatus for spreading the projecting already folded edges of sheet material wrapped on a building drum for tire casings and for stitching said sheet material around previously applied bead rings, comprising a ring of circular cross-section, a hub, radial spokes connecting said ring with said hub, said hub being mounted coaxially with respect to the drum and slidable along its axis relative thereto and free to rotate relative thereto, a pre-loaded coil spring wound in a continuous manner around said ring, the internal diameter of the coils of said spring being greater than the diameter of the cross-section of said ring such that said spring is circumferentially compressible when it contacts sheet material to be spread, the pitch of the coils of said spring being greater than the thickness of said spokes to permit said spring to roll around its own axis, means for forcing said ring inside of said drum prior to initiating the wrapping of sheet material on the drum, and means for withdrawing said ring from inside said drum after the application of the first layers of sheet material and at least one bead ring.

3. Apparatus for spreading the projecting already folded edges of sheet material wrapped on a building drum for tire casings and for stitching said sheet material around previously applied bead rings, comprising a ring of circular cross-section, a hub, radial spokes connecting said ring with said hub, said hub being mounted coaxially with respect to the drum and slidable along its axis relative thereto, a pre-compressed coil spring wound in a continuous manner around said ring, the internal diameter of the coils of said spring being greater than the diameter of the cross-section of said ring and being circumferentially compressible when it contacts sheet material to be spread, the pitch of the coils of said spring being greater than the thickness of said spokes to permit said spring to roll around its own axis, means for forcing said ring inside of said drum prior to initiating the wrapping of sheet material on the drum, a stop means for limiting the travel of said ring towards the inside of said drum, and means for withdrawing said ring from inside said drum after the application of the first layers of sheet material and at least one bead ring.

4. Apparatus for spreading the projecting already folded edges of sheet material wrapped on a building drum for tire casings and for stitching said sheet material around previously applied bead rings, comprising a spreader ring of circular cross-section, a hub, radial spokes connecting said ring with said hub, a shaft which is coaxial with respect to the drum, said hub being slidably mounted on said shaft, a bead ring carrier slidably mounted on said shaft, means for sliding said hub and said bead ring carrier on said shaft, a pre-compressed coil spring wound in a continuous manner around said ring, the internal diameter of the coils of said spring being greater than the diameter of the cross-section of said ring, said spring being circumferentially compressible when it contacts sheet material to be spread, the pitch of the coils of said spring being greater than the thickness of said spokes to permit said spring to roll around its own axis, and means for forcing said ring inside of said drum and for withdrawing said ring from inside said drum.

5. Apparatus for spreading the projecting already folded edges of sheet material wrapped on a building drum for tire casings and for stitching said sheet material around previously applied bead rings, comprising a spreader ring of circular cross-section, a hub, radial spokes connecting said ring with said hub, a shaft which is coaxial with respect to the drum, said hub being slidably mounted on said shaft, a bead ring carrier slidably mounted on said shaft, means for sliding said hub and said bead ring carrier on said shaft, and for positioning said spreader ring relative to said drum so that said bead ring carrier can be advanced toward said drum without varying the position of said spreader ring relative to said drum, said bead ring carrier including means for engaging said hub in one direction of its sliding movement, a pre-compressed coil spring wound in a continuous manner around said ring, the internal diameter of the coils of said spring being greater than the diameter of the cross-section of said ring, said spring being circumferentially compressible when it contacts sheet material to be spread, the pitch of the coils of said spring being greater than the thickness of said spokes to permit said spring to roll around its own axis, and means for forcing said ring inside of said drum and for withdrawing said ring from inside said drum.

6. Apparatus for spreading the projecting already folded edges of sheet material wrapped on a building drum for tire casings and for stitching sheet material around previously applied bead rings, comprising a spreader ring of circular cross-section, a hub, radial spokes connecting said ring with said hub, said hub being mounted coaxially with said drum and slidable along its axis, a pre-compressed coil spring wound in a continuous manner around said ring, the internal diameter of the coils of said spring being greater than the diameter of the cross-section of said ring, said spring being circumferentially compressible when it contacts sheet material to be spread, means for forcing said ring inside said drum prior to initiating the wrapping of sheet material on said drum, stopping means for arresting the travel of said ring towards the interior of the drum at an optimum position for initiating the successive spreading and stitching operations, and means for withdrawing said ring from the inside of said drum after the application of the first layers of sheet material and at least one bead ring.

7. Apparatus for spreading the projecting already folded edges of sheet material wrapped on a building drum for tire casings and for stitching sheet material around previously applied bead rings, comprising a spreader ring of circular cross-section, a hub, radial spokes connecting said ring with said hub, said hub being mounted coaxially with said drum and slidable along its axis, a pre-compressed coil spring wound in a continuous manner around said ring, the internal diameter of the coils of said spring being greater than the diameter of the cross-section of said ring, said spring being circumferentially compressible when it contacts sheet material to be spread, the pitch of the coils being greater than the thickness of the spokes and such as to permit the coil to roll around its own axis, means for forcing said ring inside said drum prior to initiating the wrapping of sheet material on said drum, stopping means for arresting the travel of said ring towards the interior of the drum at an optimum position for initiating the successive spreading and stitching operations, and means for withdrawing said ring from the inside of said drum, while the latter is stationary, after the application of the first layers of sheet material and at least one bead ring.

8. Apparatus for spreading the projecting already folded edges of sheet material wrapped on a building drum for tire casings and for stitching sheet material around previously applied bead rings, comprising a spreader ring of circular cross-section, a hub, radial spokes connecting said ring with said hub, said hub being mounted coaxially with said drum and slidable along its axis and free to rotate around it, a coil spring wound in a continuous manner around said ring after being subjected to preliminary compression, the internal diameter of the coils of said spring being greater than the diameter of the cross-section of said ring and being such as to allow further compression of said spring when it contacts sheet material to be spread, the pitch of the coils being greater than the thickness of the spokes and such as to permit the coil to roll around its own axis, means for forcing said ring inside said drum prior to initiating the wrapping of sheet material on said drum, adjustable stopping means for arresting the travel of said ring towards the interior of the drum at an optimum position for initiating the successive spreading and stitching operations, and means for withdrawing said ring from the inside of said drum after the application of the first layers of sheet material and at least one bead ring, while said drum itself rotates at a speed such as to create at the edges of the sheet material wrapped thereon a centrifugal force sufficient to maintain them spread outwardly after the withdrawal of said ring from the interior of the drum.

9. Apparatus for spreading the projecting already folded edges of sheet material wrapped on a building drum for tire casings and for stitching around previously applied bead rings, comprising a spreader ring of circular cross-section, a hub, radial spokes connecting said spreader ring with said hub, a bead ring carrier, a device supporting said hub and said carrier so that said hub and said carrier are coaxial to said drum and slidable relative to said drum and slidable relative to each other, adjustable stop means preventing more than a predetermined movement of said spreader ring into the interior of said drum, means responsive to movement of said bead ring carrier away from said drum for carrying said spreader ring in the same direction, said bead ring carrier and said spreader ring freely rotatable about their axes, a closed coil spring of metallic wire of constant characteristics throughout its length, including the weld point at its ends, said coil being wound in a continuous fashion around said spreader ring after being subjected to preliminary compression and wherein the internal diameter of the coils of said spring is greater than that of the cross-section of said spreader ring upon which they are wound and such to allow further compression when said spring contacts sheet material to be spread out, the pitch of the coils of said spring being greater than the thickness of said spokes and such to allow said spring to roll around its axis, means for forcing said spreader ring inside said building drum prior to initiating the application of sheet material, and means for withdrawing said spreader ring from inside said drum after the application of the first layers of sheet material and of at least one bead ring, while said drum is rotating at a speed such as to create at the edges of the sheet material a centrifugal force sufficient to maintain said edges spread outwardly after the withdrawal of said spreader ring from the interior of said drum.

10. In a tire building apparatus, an open-ended cylindrical drum, a rotatable shaft for rotating said drum on a substantially fixed horizontal axis, a slidable support means mounted for sliding movement in a direction parallel to the axis of said drum, a first sleeve mounted on said support coaxial with said rotatable shaft and spaced therefrom, a disc-shaped bead ring carrier freely rotatably mounted on said first sleeve and having thereon an outer peripheral flange for supporting a bead ring, a second sleeve mounted on said shaft between said first sleeve and said shaft and frictionally engaging said first sleeve and relatively axially slidable with respect thereto, a hub freely rotatably mounted on said second sleeve between said bead ring carrier and said drum, a spreader ring of circular cross-section coaxially surrounding said shaft, radial spokes connecting said spreader ring with said hub, a closed and pre-compressed spring of metallic wire wound in continuous fashion around said spreader ring, means for moving said movable support towards and away from said drum, a stop means mounted on said shaft for limiting the axial movement of said hub as said movable support is moved toward said drum, and an abutment on said second sleeve for engaging said first sleeve as said movable support is moved away from said drum.

11. In a tire building apparatus for spreading the projecting and already folded edges of sheet material on an open-ended and cylindrical building drum, a rotatable shaft for rotating said drum on a substantially fixed horizontal axis, a slidable support means mounted for sliding movement in a direction parallel to the axis of said drum, a first sleeve mounted on said support coaxial with said rotatable shaft and spaced therefrom, a bead ring carrier freely rotatably mounted on said first sleeve and having thereon means for supporting a bead ring, a second sleeve slidably mounted on said shaft between said first sleeve and said shaft, said second sleeve slidably and frictionally engaging said first sleeve, a hub freely rotatably mounted on said second sleeve between said bead ring carrier and said drum, a spreader ring of circular cross section arranged coaxially with said shaft, radial spokes connecting said spreader ring with said hub, a closed and pre-compressed spring of metallic wire wound in continuous fashion around said spreader ring, means for moving said movable support towards and away from said drum, a stop means mounted on said shaft for limiting the axial movement of said hub as said movable support is moved toward said drum, and an abutment on said second sleeve for engaging said first sleeve as said movable support is moved away from said drum, whereby, prior to the folding of said edges of sheet material, said movable support may be advanced towards said drum until said hub engages said abutment on said shaft and said spreader ring occupies a position inside one open end of said drum, and whereby, after the folding of said edges of sheet material, said movable support may be further advanced towards said drum until said spreader ring places a bead ring against the folded edges of said sheet material, and whereby, as said movable support is thereafter moved away from said drum, said bead ring carrier may be moved therewith until said abutment on said second sleeve engages said first sleeve, and whereby, upon the further movement of said movable support away from said drum, said spring will be circumferentially compressed by the folded edges of said sheet material and said spreader ring may be pulled away from the open end of said drum, said spring circumferentially expanding thereafter and folding the edges of said material upwardly around said bead ring.

References Cited in the file of this patent

UNITED STATES PATENTS

| | | |
|---|---|---|
| 2,313,035 | Breth | Mar. 9, 1943 |
| 2,477,718 | Breth | Aug. 2, 1949 |
| 2,488,863 | Haase | Nov. 22, 1949 |